United States Patent
Yuds et al.

(10) Patent No.: US 12,553,762 B2
(45) Date of Patent: Feb. 17, 2026

(54) LIQUID LEVEL DETECTORS

(71) Applicant: Fresenius Medical Care Holdings, Inc., Waltham, MA (US)

(72) Inventors: David Yuds, Hudson, NY (US); Mark Googasian, Sandy, UT (US)

(73) Assignee: FRESENIUS MEDICAL CARE HOLDINGS, INC., Waltham, MA (US)

( * ) Notice: Subject to any disclaimer, the term of this patent is extended or adjusted under 35 U.S.C. 154(b) by 313 days.

(21) Appl. No.: 18/379,680

(22) Filed: Oct. 13, 2023

(65) Prior Publication Data

US 2024/0142293 A1 May 2, 2024

Related U.S. Application Data

(60) Provisional application No. 63/419,557, filed on Oct. 26, 2022.

(51) Int. Cl.
*G01F 23/18* (2006.01)
*A61M 1/16* (2006.01)
*G01F 23/30* (2006.01)

(52) U.S. Cl.
CPC ........... *G01F 23/30* (2013.01); *A61M 1/1603* (2014.02)

(58) Field of Classification Search
CPC ........ G01F 23/30; G01F 1/007; G01F 23/185; G01F 23/64; G01F 23/0007; G01F 23/14; G01F 23/16; G01F 23/161; A61M 1/1603; A61M 2205/3331; A61M 2205/3334; A61M 2205/3389; A61M 2205/583; A61M 1/1668

USPC ..... 73/290 R, 291, 294, 298, 299, 301, 302, 73/303; 138/104, 155; 285/124.1, 124, 285/124.3, 134.1, 135.1

See application file for complete search history.

(56) References Cited

U.S. PATENT DOCUMENTS

| | | |
|---|---|---|
| 1,966,658 A | 7/1934 | Wade |
| 4,009,098 A | 2/1977 | Jeris |

(Continued)

FOREIGN PATENT DOCUMENTS

| | | |
|---|---|---|
| CH | 641964 A5 | 3/1984 |
| CN | 205801454 U | 12/2016 |

(Continued)

OTHER PUBLICATIONS

International Search Report and Written Opinion issued in corresponding International patent Application No. PCT/US2023/035068 dated Mar. 12, 2024 (10 pages).

*Primary Examiner* — Robert R Raevis
(74) *Attorney, Agent, or Firm* — Kilyk & Bowersox, P.L.L.C.

(57) ABSTRACT

Liquid level detectors may include a pump for drawing liquid from a reservoir, a channel fluidically coupling the pump to the reservoir, and a J-tube connected to an end of the channel within the reservoir. The J-tube may include a first tube section and a second tube section extending along the first tube section. Perforations may extend between the first tube section and the second tube section. A pressure sensor may be positioned and configured to sense a pressure of liquid drawn from the reservoir through the J-tube and the channel and to sense pressure drops when a liquid level in the reservoir passes the respective perforations. Various other related systems and methods are also disclosed.

20 Claims, 6 Drawing Sheets

(56) References Cited

U.S. PATENT DOCUMENTS

| | | | |
|---|---|---|---|
| 4,182,178 A * | 1/1980 | Nolte | G01F 23/00 |
| | | | 73/299 |
| 4,567,762 A | 2/1986 | Hopper et al. | |
| 4,717,377 A | 1/1988 | Fukasawa | |
| 4,772,157 A | 9/1988 | Obermeyer | |
| 4,892,524 A | 1/1990 | Smith | |
| 4,921,020 A | 5/1990 | Pamper | |
| 5,178,179 A | 1/1993 | Polaschegg et al. | |
| 5,185,007 A | 2/1993 | Middaugh et al. | |
| 5,195,961 A | 3/1993 | Takahashi et al. | |
| 5,303,730 A * | 4/1994 | Trueb | F16L 59/168 |
| | | | 138/158 |
| 5,465,766 A | 11/1995 | Siegele et al. | |
| 5,669,892 A | 9/1997 | Keogh et al. | |
| 6,391,000 B1 | 5/2002 | Belikan et al. | |
| 2002/0078995 A1 | 6/2002 | Kramer | |
| 2002/0088752 A1 | 7/2002 | Balschat et al. | |
| 2005/0209585 A1 | 9/2005 | Nord et al. | |
| 2010/0269587 A1 | 10/2010 | Wu et al. | |
| 2011/0220124 A1 * | 9/2011 | Vaska | A61M 16/0463 |
| | | | 128/848 |
| 2012/0203478 A1 | 8/2012 | Smaidris et al. | |
| 2013/0004593 A1 | 1/2013 | Kloeffel et al. | |
| 2013/0045852 A1 | 2/2013 | Chapman et al. | |
| 2013/0092288 A1 | 4/2013 | Schriber | |
| 2014/0319179 A1 | 10/2014 | Bazoberry | |
| 2015/0011953 A1 | 1/2015 | Schmidt | |
| 2017/0084157 A1 | 3/2017 | Lucas et al. | |

FOREIGN PATENT DOCUMENTS

| | | |
|---|---|---|
| DE | 546439 C | 3/1932 |
| DE | 3215003 A1 | 11/1983 |
| DE | 284453 A5 | 11/1990 |
| DE | 202014003914 U1 | 6/2014 |
| FR | 2774008 A1 | 7/1999 |
| GB | 1227351 A | 4/1971 |
| WO | 9743202 A1 | 11/1997 |
| WO | 2011015529 A2 | 2/2011 |
| WO | 2015150606 A1 | 10/2015 |

\* cited by examiner

600

```
┌─────────────────────────────────────────────────────────────┐
│   Draw liquid from a reservoir through a channel with a pump │
│                             610                              │
└─────────────────────────────────────────────────────────────┘
                              │
                              ▼
┌─────────────────────────────────────────────────────────────┐
│   Draw the liquid into the channel from a first tube section of a J-tube │
│                             620                              │
└─────────────────────────────────────────────────────────────┘
                              │
                              ▼
┌─────────────────────────────────────────────────────────────┐
│   Draw at least some of the liquid into the first tube section from a │
│   second tube section that extends along the first tube section and │
│   through perforations extending between the first tube section and │
│                  the second tube section                     │
│                             630                              │
└─────────────────────────────────────────────────────────────┘
                              │
                              ▼
┌─────────────────────────────────────────────────────────────┐
│   Detect, with a pressure sensor, a pressure drop in the liquid drawn │
│   through the channel when a liquid level within the reservoir passes a │
│   respective one of the perforations to determine the liquid level within │
│                        the reservoir                         │
│                             640                              │
└─────────────────────────────────────────────────────────────┘
```

*FIG. 6*

LIQUID LEVEL DETECTORS

This application claims the benefit under 35 U.S.C. § 119(e) of prior U.S. Provisional Patent Application No. 63/419,557, filed Oct. 26, 2022, which is incorporated in its entirety by reference herein.

BACKGROUND

Dialysis is a treatment for patients who have experienced kidney failure. In individuals with fully functioning kidneys, the kidneys remove excess water and nitrogen waste materials (e.g., in the form of urea and creatinine) from the blood and pass these materials to the bladder for expulsion from the body. Without properly functioning kidneys, a patient may not be able to maintain proper blood pH level and pressure. Dialysis may replace or supplement the kidneys' function in such patients.

Hemodialysis is a type of dialysis in which blood is drawn from a patient via an artery, passed through a dialyzer, and returned to the patient via a vein. The dialyzer includes a semi-permeable membrane with the patient's blood passing along one side of the membrane and a dialysate solution on the other side of the membrane. The dialysate solution typically includes an acid and bicarbonate in purified water. Waste products pass from the blood to the dialysate solution and treated (e.g., cleaned) blood can pass out of the dialyzer and back to the patient's circulatory system.

Some hemodialysis machines are configured to purify water to be mixed with solutes to produce the dialysate solution onsite and on demand. A user may dispose a sufficient amount of unpurified water (e.g., tap water) in a receptacle that is pumped into a purifier and then mixed with the solutes to produce enough dialysate solution for a complete dialysis session. If insufficient unpurified water is provided to the hemodialysis machine, a dialysis session may be cut short or delayed while the user re-fills the receptacle.

Determining the level of liquid added to a receptacle can be accomplished in a variety of ways. For example, a load cell may be placed under the receptacle and the receptacle may be weighed. An electronic level sensor can also determine a liquid level. Electronic level sensors may periodically require cleaning and maintenance. Load cells and electronic level sensors may add to the complexity, cost, and weight of the system.

BRIEF DESCRIPTION OF THE DRAWINGS

The accompanying drawings illustrate a number of example embodiments and are a part of the specification. Together with the following description, these drawings demonstrate and explain various principles of the present disclosure.

FIG. 6 is a flow diagram illustrating a method of detecting a liquid level in a reservoir, according to at least one embodiment of the present disclosure.

Figure 1:
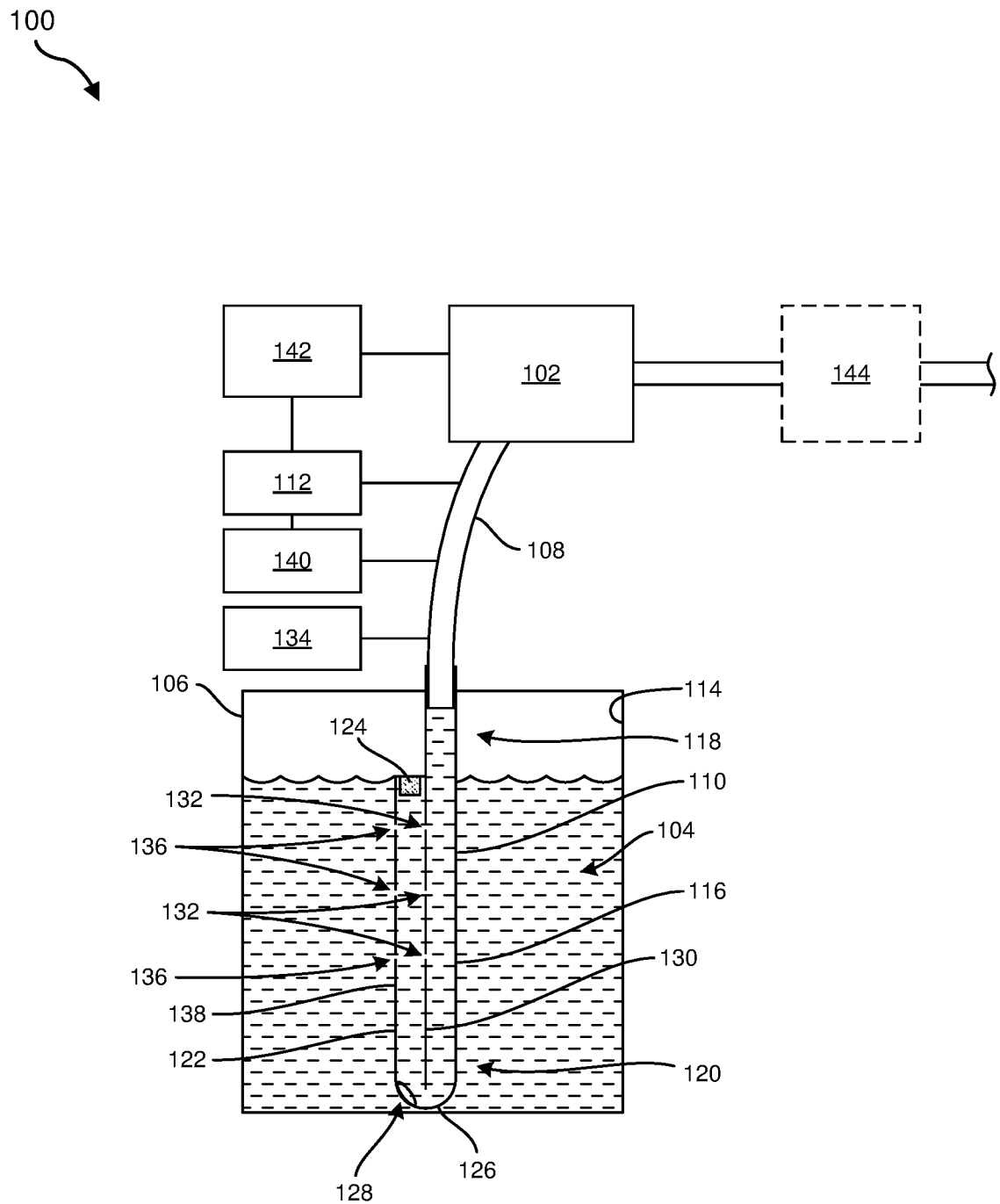
FIG. 1 is a schematic side view of a liquid level detector, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION

The present disclosure provides detailed descriptions of liquid level detectors and systems including liquid level detectors. As will be explained in greater detail below, embodiments of the present disclosure may include a J-shaped tube (also referred to herein as a "J-tube") with perforations that can be used to induce pressure drops as the liquid level descends past the perforations. A pressure sensor may be used to sense these pressure drops to detect and predict the liquid level. The J-tube may enable liquid level detection without complex, costly, and/or heavy mechanisms.

Features from any of the embodiments described herein may be used in combination with one another in accordance with the general principles described herein. These and other embodiments, features, and advantages will be more fully understood upon reading the following detailed description in conjunction with the accompanying drawings and claims.

FIG. 1 is a schematic side view of a liquid level detector 100, according to at least one embodiment of the present disclosure. The liquid level detector 100 may include a pump 102 for drawing liquid 104 (e.g., water, a chemical solution, etc.) from a reservoir 106 through a channel 108 and a J-tube 110 connected to an end of the channel 108 and within the reservoir 106. A pressure sensor 112 may be positioned and configured to sense a pressure of the liquid 104 that is drawn from the reservoir 106 through the J-tube 110 and the channel 108.

The pump 102 may be any suitable pump 102 for pumping the liquid 104. For example, the pump 102 may be an impeller pump, a displacement pump, a diaphragm pump, a peristaltic pump, a gear pump, a rotary vane pump, or the like.

The reservoir 106 may be any receptacle for holding the liquid 104. In some embodiments, the reservoir 106 may include substantially vertical sidewalls 114, which may facilitate sensing how much of the liquid 104 within the reservoir 106 has been withdrawn by the pump 102. For example, vertical and straight sidewalls 114 may simplify a calculation of a change of volume of the liquid 104 based on data from the pressure sensor 112. In additional embodiments, the reservoir 106 may include non-vertical sidewalls 114, such as angled inward, angled outward, stepped, curved, etc. In this case, a calculation used to estimate the liquid level may be adjusted to account for the non-vertical sidewalls 114.

In some examples, the term "substantially" in reference to a given parameter, property, or condition, may refer to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or fully met.

The channel 108 may be any suitable conduit for withdrawing the liquid 104 from the reservoir 106. For example, the channel 108 may include polymer tubing, metal tubing, composite tubing, or the like. The channel 108 may be flexible or rigid. In some examples, the channel 108 may be formed of a material that does not float in water, such as high-density polyethylene (HDPE) material.

The J-tube 110 may include a first tube section 116 that has a proximal end 118 and a distal end 120. The proximal end 118 may be configured to couple to an end of the channel 108. In some examples, the proximal end 118 may be removably coupled to the end of the channel 108, such as with a luer-lock connection or other suitable removable connection. This may enable the J-tube 110 to be removed for cleaning or replacement. The distal end 120 may be configured to extend downward into the reservoir 106.

The J-tube 110 may also include a second tube section 122 that extends upward from the distal end 120 of the first tube section 116 and along the first tube section 116, forming a narrow "J" shape. A float 124 may be positioned within the second tube section 122 and may be shaped and sized to drop within the second tube section 122 as the liquid level in the reservoir 106, and thus within the second tube section 122, drops. The distal end 120 of the first tube section 116 and the second tube section 122 may be coupled to each other with a curved section 126 at a base of the J-tube 110. A draw hole 128 may be located in the curved section 126 and may be oriented at an angle to avoid becoming blocked against a bottom of the reservoir 106. The draw hole 128 may be shaped and sized to draw the liquid 104 into the J-tube 110 upon actuation of the pump 102.

The first tube section 116 and the second tube section 122 may share a common wall 130 therebetween. The common wall 130 may be a unitary, integral material or may include two walls adjacent to each other. For example, a wall of the first tube section 116 and a wall of the second tube section 122 may abut each other, may be adhered to each other, and/or may be welded to each other.

Perforations 132 may extend between the first tube section 116 and the second tube section 122, such as through the common wall 130. The perforation 132 may be spaced (e.g., substantially uniformly spaced) along the common wall 130 at known distances from each other (e.g., every 0.5 inch, every inch, etc.). Three perforations 132 are illustrated in FIG. 1, although the J-tube 110 may include another quantity of perforations 132 (e.g., four, five, six, etc.) in other embodiments. The perforations 132 may be configured to enable the pressure sensor 112 to sense drops in pressure as the level of the liquid 104 descends past the respective perforations 132 while the liquid 104 is withdrawn from the reservoir 106 by the pump 102. Without the perforations 132, the pressure sensor 112 would sense a substantially constant pressure in fluid within the channel 108 until the level of the liquid 104 reaches the draw hole 128.

The size of the perforations 132 may be tailored to result in a pressure drop as the level of the liquid 104 descends below each perforation 132, while still allowing the pump 102 to draw the liquid 104 through the J-tube 110 and the channel 108 without excessive air. By way of example and not limitation, each perforation 132 may have a diameter of about 0.5 mm or less, such as about 0.4 mm, 0.25 mm, or 0.2 mm. Some air (e.g., bubbles) may pass through the perforations 132 into the J-tube 110 and into the channel 108 when the level of the liquid 104 is below the respective perforations 132. This air may be removed from the liquid level detector 100, such as with a deaerator 134 in fluid communication with the channel 108.

Additional perforations 136 may pass through an outer wall 138 of the second tube section 122. The additional perforations 136 may allow fluid communication between the reservoir 106 and an interior of the second tube section 122. When the level of the liquid 104 is above the additional perforations 136, the additional perforations 136 may allow some of the liquid 104 to pass from the reservoir 106 into the second tube section 122, which may facilitate the drawing of the liquid 104 through the J-tube 110 by the pump 102. When the level of the liquid 104 is below any of the additional perforations 136, air may flow through these additional perforations 136 and into the second tube section 122, which may facilitate air reaching the perforations 132 to result in a pressure drop as sensed by the pressure sensor 112.

The float 124 within the second tube section 122 may improve a pressure drop signal detected by the pressure sensor 112, compared to a similar system without the float 124. For example, the float 124 may cause the pressure to drop more suddenly and clearly when the float 124 passes one of the perforations 132, as opposed to some air and some of the liquid 104 passing through the perforation 132 when the level of the liquid 104 reaches the perforation 132 as might occur without the float 124.

In some embodiments, the float 124 may also be configured to detect contaminants and/or certain chemicals in the liquid 104. For example, the float 124 may have the ability to change color when exposed to a certain chemical (e.g., bleach). The color change may signal the user that the liquid 104 should be changed and/or that the reservoir 106 should be cleaned. Additionally or alternatively, the float 124 may be configured to expand in the presence of certain chemicals. Expansion of the float 124 may result in the float 124 becoming stuck in the J-tube 110 and unable to drop with the descending level of the liquid 104. The absence of a clear pressure drop when it is expected that the level of the liquid 104 drops past one or more of the perforations 132 may indicate to the system that a chemical contaminant may be present.

A flow rate sensor 140 may be fluidically coupled to the channel 108 to sense a rate of flow of the liquid 104 as it passes through the channel 108.

At least one processor 142 may be in communication with the pump 102, the pressure sensor 112, and the flow rate sensor 140. The processor 142 may be configured to monitor a duration that the pump 102 is in operation. The processor 142 may also be configured to identify pressure drops sensed by the pressure sensor 112 as the level of the liquid 104 descends below each perforation 132 and to record the time between the pressure drops at the respective perforations 132. With the flow rate, time between pressure drops, and known distance between the perforations 132, the processor 142 may be able to calculate a volume of the liquid 104 drawn out of the reservoir 106 by the pump 102 between each perforation 132. The processor 142 may also be able to predict when the level of the liquid 104 will reach the next perforation 132 and/or the draw hole 128. The prediction may be verified as additional pressure drops are recorded. These calculations may take into account a change in pump efficiency as the pressure of the liquid 104 in the channel 108 drops. In addition, if the sidewalls 114 of the reservoir 106 are not substantially vertical, the calculations can take into account a known shape of the sidewalls 114 and adjust for the geometric difference. The known shape of the sidewalls 114 and expected pressure drops associated with different reservoir 106 types may be available to the processor 142 from a lookup table.

If the processor 142 predicts that the reservoir 106 will become empty prior to the pump 102 drawing sufficient liquid 104 to perform a desired fluidic operation, the processor 142 may alert a user that additional liquid 104 should be added to the reservoir 106.

In addition, if an initial pressure sensed by the pressure sensor 112 is significantly lower than expected, the processor 142 may determine that insufficient liquid 104 is initially disposed in the reservoir 106. In this case, the processor 142 may inhibit operation of the pump 102 and may alert the user that more of the liquid 104 should be added to the reservoir 106 before operation commences.

The pump 102 may deliver the liquid 104 drawn from the reservoir 106 to a destination 144. The destination 144 may be a fluidic mechanism, a fluid receptacle, a fluid conduit, or any other destination 144 that may use or store the fluid 104. By way of example and not limitation, the destination 144 may include a water purifier, a dialysate mixing mechanism, a hemodialysis machine, a storage receptacle, a deaerator, piping, a heater, an additional pump, or the like.

The liquid level detector 100 is illustrated in FIG. 1 with the pressure sensor 112, deaerator 134, and flow rate sensor 140 along the channel 108 fluidically prior to the pump 102. However, the present disclosure is not so limited. Depending on the type of pump 102, in additional examples, one or more of these components may be positioned fluidically downstream from the pump 102.

Figure 2:
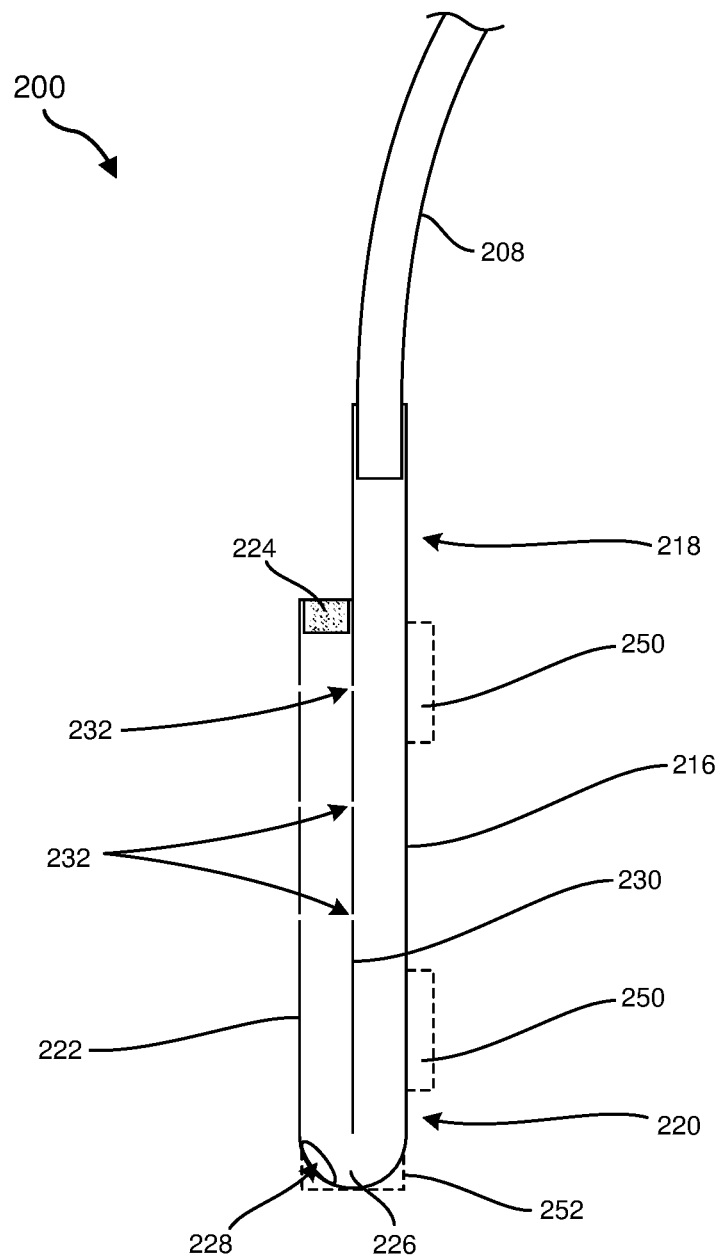
FIG. 2 is a schematic side view of a J-tube for detecting a liquid level, according to at least one embodiment of the present disclosure.

FIG. 2 is a schematic side view of a J-tube 200 for detecting a liquid level, according to at least one embodiment of the present disclosure. In some respects, the J-tube 200 may be similar to the J-tube 110 discussed above with reference to FIG. 1. For example, the J-tube 200 may include a first tube section 216 including a proximal end 218 for coupling to a channel 208, a distal end 220 configured to extend downward into a reservoir for holding liquid, and a second tube section 222 extending upward along the first tube section 216 from the distal end 220 of the first tube section 216. A float 224 may be movably positioned within the second tube section 222. A curved section 226 may couple (e.g., physically and fluidically couple) the first tube section 216 to the second tube section 222. A draw hole 228 sized and shaped to draw the liquid into the J-tube 200 may be positioned in the curved section 226. A common wall 230 between the first tube section 216 and the second tube section 222 may include perforations 232 extending and providing fluid communication between the first tube section 216 and the second tube section 222.

As illustrated in FIG. 2, the J-tube 200 may also include one or more features for keeping the J-tube 200 upright and in a proper orientation and position within a liquid-filled reservoir, such that the draw hole 228 may be positioned at or near a bottom of the reservoir. In one example, at least one coupler 250 may be used to secure the J-tube 200 to a sidewall of the reservoir. For example, the coupler 250 may include a magnet, a protrusion for being disposed within a corresponding groove or extension in the sidewall, or a clip for grasping the J-tube 200. The coupler 250 may be secured to or a part of the sidewall of the reservoir. In additional embodiments, the coupler 250 may be secured to or may be a part of the J-tube 200 (e.g., secured to the first tube section 216 as shown in FIG. 2 or to the second tube section 222). Thus, a user may position the J-tube 200 within a receptacle by securing (e.g., removably securing) the J-tube 200 to the sidewall of the receptacle with the coupler 250.

In some embodiments, the J-tube 200 may include a weight 252 at or near a base of the J-tube 200. For example, the weight 252 may be secured to the curved section 226. The weight 252 may be denser than the liquid within the receptacle, such that the weight 252 sinks in the liquid and rests on a bottom of the receptacle.

The channel 208 coupled to the J-tube 200 may tend to maintain the proximal end 218 of the first tube section 216, and therefore a top end of the J-tube 200, in an upward orientation. In additional examples, the reservoir may include a cover to which the J-tube 200 or channel 208 may be coupled.

FIGS. 3A-3D illustrate a liquid level detector 300 in use at various liquid levels, according to at least one embodiment of the present disclosure. In some respects, the liquid level detector 300 may be similar to the liquid level detector 100 described above with reference to FIG. 1. For example, the liquid level detector 300 may include a reservoir 306 for holding a liquid 304 and a J-tube 310 positioned at least partially in the reservoir and fluidically connected to a channel 308 for drawing the liquid 304 from the reservoir. A pressure sensor 312 may be fluidically coupled to the channel 308 and may be configured to sense a pressure of the liquid 304. The J-tube 310 may include a first tube section 316, a second tube section 322, and perforations 332 extending between the first tube section 316 and the second tube section 322. The perforations 332 may include an upper perforation 332A, a middle perforation 332B, and a lower perforation 332C. A float 324 may be disposed within the second tube section 322. A draw hole 328 may be located at or near a bottom of the J-tube 310.

Figure 3:
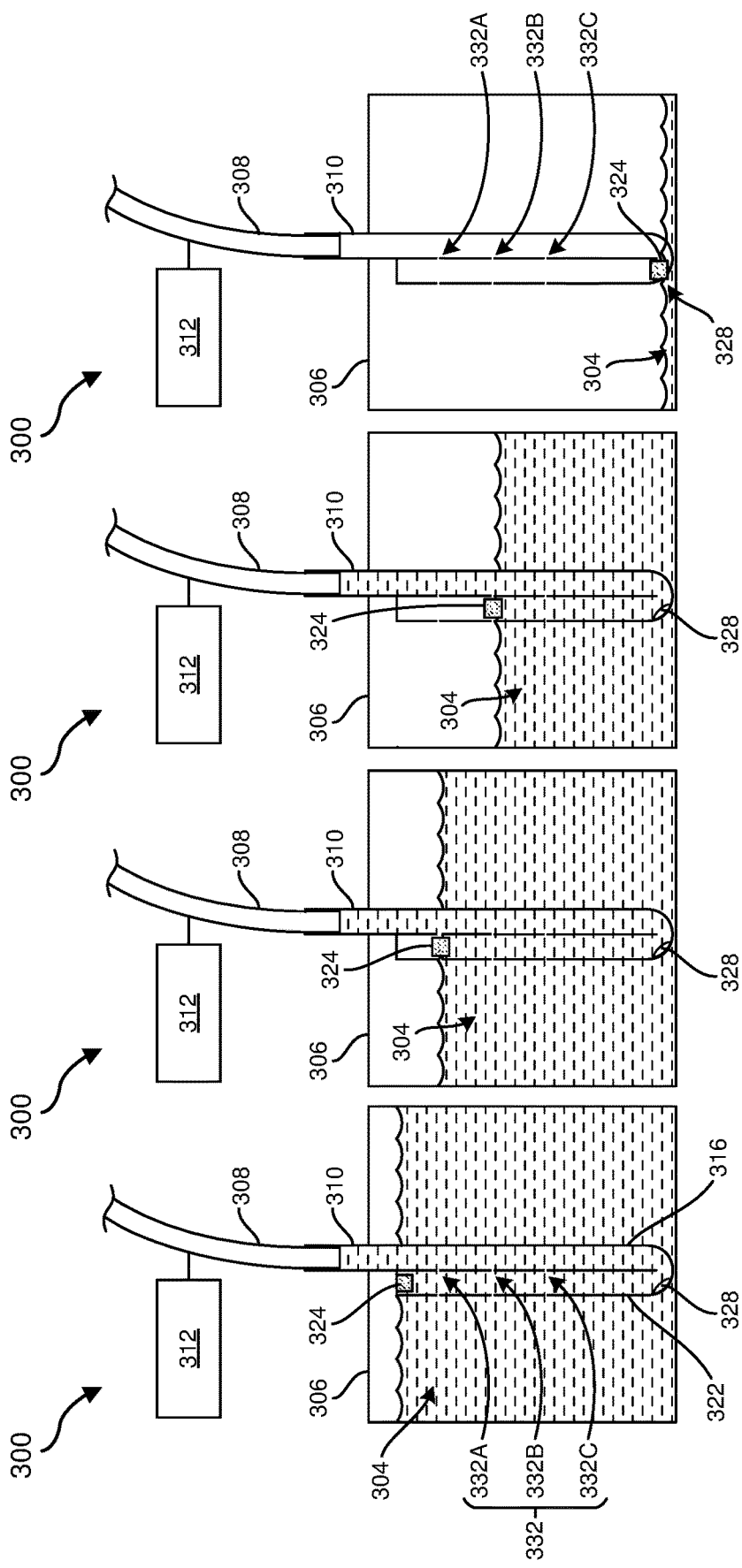
FIGS. 3A-3D illustrate a liquid level detector in use at various liquid levels, according to at least one embodiment of the present disclosure.

As illustrated in FIG. 3A, the liquid 304 may initially fill the reservoir 306 to a level above the upper perforation 332A. The pressure sensor 312 may sense a predetermined initial pressure to verify that the reservoir 306 is filled to a sufficient level.

As illustrated in FIG. 3B, the liquid 304 may be drawn out of the reservoir 306 through the J-tube 310 and the channel 308 (e.g., by a pump) to a level of the upper perforation 332A. At this stage, the float 324 may pass the upper perforation 332A, resulting in a first pressure drop as detected by the pressure sensor 312. The liquid level detector 300 (e.g., a processor thereof) may note a time when this first pressure drop occurs.

As illustrated in FIG. 3C, the liquid 304 may continue to be drawn out of the reservoir 306 through the J-tube 310 and the channel 308 until a level of the liquid 304 reaches the middle perforation 332B. At this point, the float 324 may pass the middle perforation 332B and the pressure sensor 312 may detect a second pressure drop in the liquid 304. The liquid level detector 300 may note a time when this second pressure drop occurs and may calculate a volume of the liquid 304 withdrawn from the reservoir 306 between the time of the first pressure drop and the second pressure drop. At this time, the liquid level detector 300 may also predict when the level of the liquid 304 will reach the lower perforation 332C, the draw hole 328, and/or any other perforations in the J-tube 310.

As illustrated in FIG. 3D, the liquid 304 may continue to be drawn out of the reservoir 306 past the lower perforation 332C (at which point the time may be noted and the volume of liquid 304 withdrawn may be calculated and/or verified)

and to the draw hole 328. When the level of the liquid 304 reaches the draw hole 328, the pump may no longer be capable of withdrawing more of the liquid 304 from the reservoir 306, and the float 324 may reach and at least partially plug the draw hole 328. This may result in a significant pressure drop, which may be detected by the pressure sensor 312 and which may indicate that the pump should be shut off. Alternatively, the pump may be shut off before the level of the liquid 304 reaches the draw hole 328. Shutting off the pump prior to this time may reduce an amount of air within the channel 308 and/or pump, which may prolong the operational life and improve efficiency of the pump, liquid level detector 300, and any fluidic mechanism (e.g., hemodialysis machine) that receives the liquid 304 from the liquid level detector 300 and associated pump.

Figure 4:
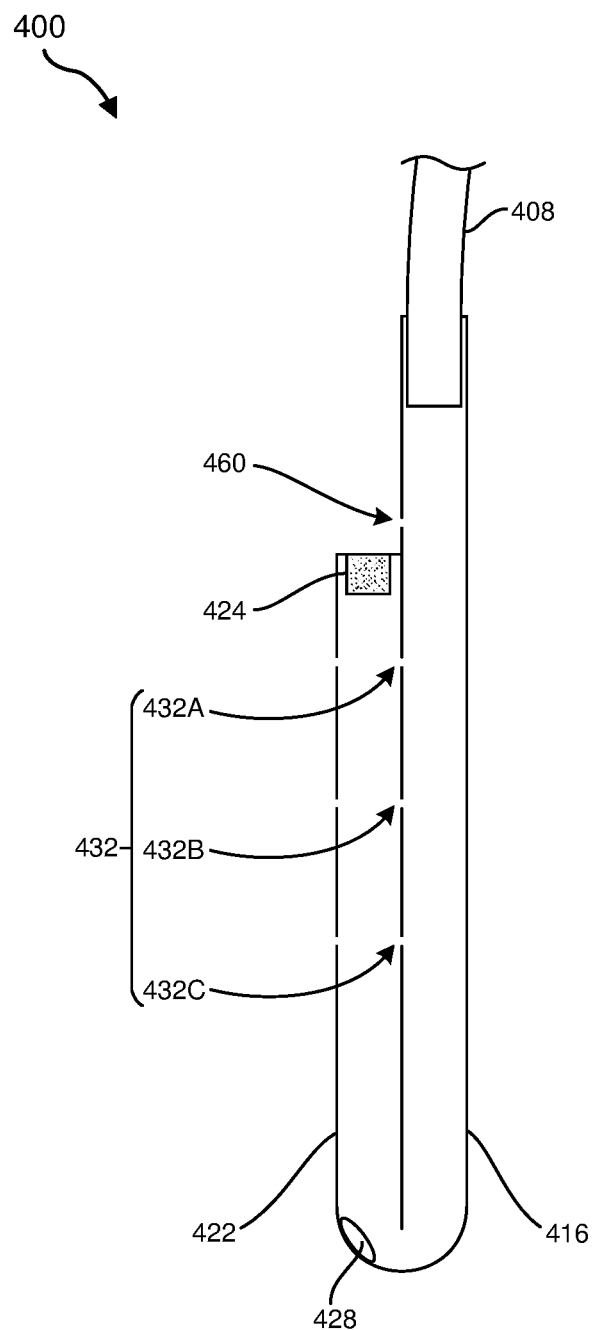
FIG. 4 is a schematic side view of a J-tube for detecting a liquid level, according to at least one additional embodiment of the present disclosure.

FIG. 4 is a schematic side view of a J-tube 400 for detecting a liquid level, according to at least one additional embodiment of the present disclosure. In some respects, the J-tube 400 may be similar to the J-tubes 110, 200, and/or 300 discussed and explained above. For example, the J-Tube 400 may include a first tube section 416 configured to couple to a channel 408, a second tube section 422, and perforations 432 extending between the first tube section 416 and the second tube section 422. The perforations 432 may include an upper perforation 432A, a middle perforation 432B, and a lower perforation 432C. A float 424 may be disposed within the second tube section 422. A draw hole 428 may be located at or near a bottom of the J-tube 410.

As shown in FIG. 4, the J-tube 400 may also include an indicator perforation 460 positioned in the first tube section 416 above a top of the second tube section 422. The indicator perforation 460 may be useful to detect an overfill condition. For example, in examples in which a system employing the J-tube 400 may be affected by overfilling a reservoir, a liquid at or above the indicator perforation 460 may be detectable by a pressure sensor having an initial reading that is too high or reading a pressure drop sooner than expected as the level of the liquid drops past the indicator perforation 460. Such an indication may cause the system to stop pumping the liquid out of the reservoir prior to becoming empty or close to empty to avoid pumping too much of the liquid into the system. In additional examples, the system may alert a user to remove some of the liquid as a result of determining that the initial liquid level is too high.

Figure 5:
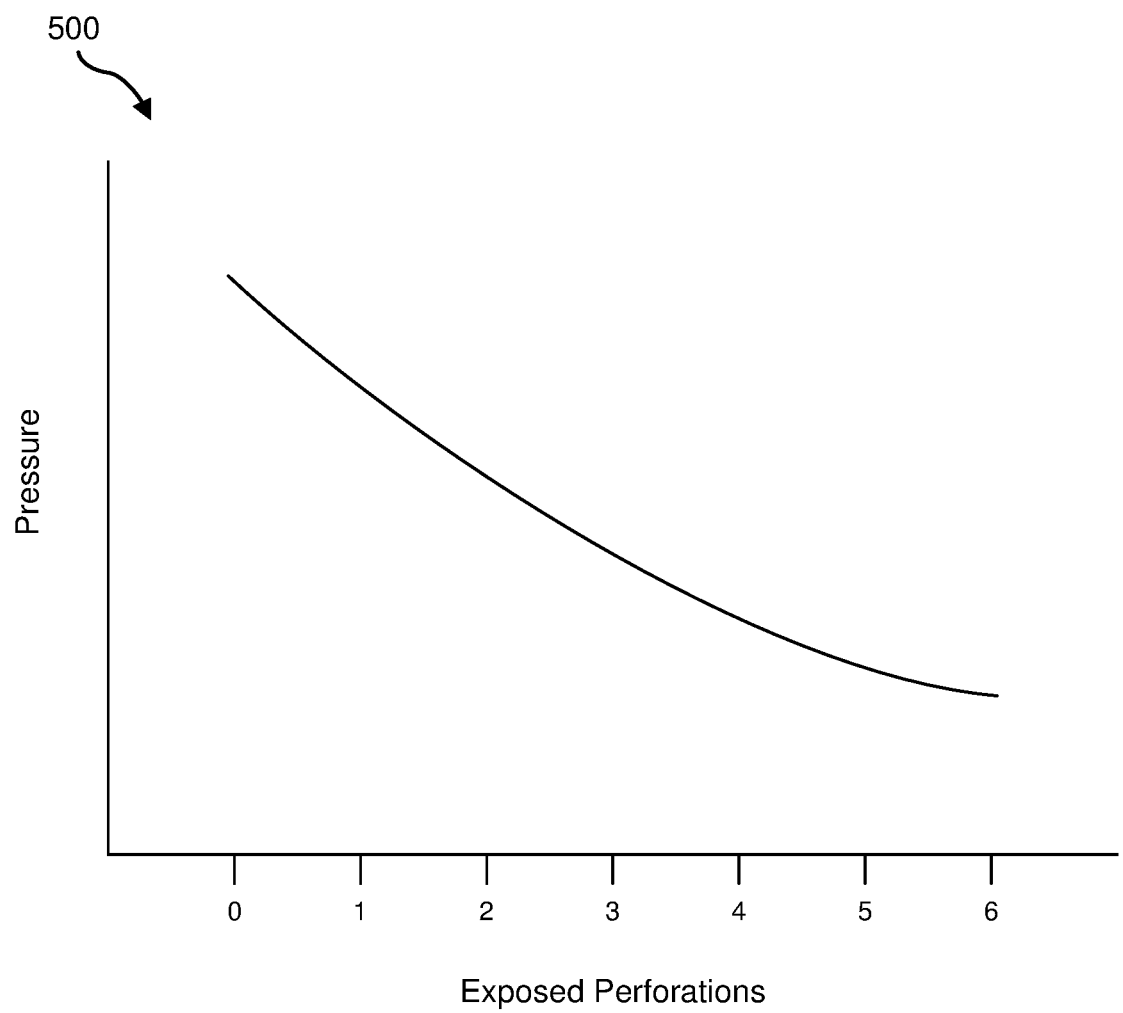
FIG. 5 is a plot showing a drop in pressure as perforations along a J-tube are exposed when a liquid is withdrawn through the J-tube, according to at least one embodiment of the present disclosure

FIG. 5 is a plot 500 showing a drop in pressure as perforations along a J-tube are exposed when a liquid is withdrawn through the J-tube, according to at least one embodiment of the present disclosure. The plot 500 relates to a J-tube that has six perforations. When none of the six perforations are exposed to air, the pressure sensed downstream along a channel withdrawing liquid through the J-tube from a reservoir may be relatively high. As the perforations become exposed to air, the pressure may drop as shown by the plot 500.

The plot 500 represents the drop in pressure with a smooth curve. However, in some embodiments, the pressure drop may be stepped, with distinct drops in pressure as each consecutive perforation is exposed. Such pressure drops may be clearer and more distinct when a float is used in the J-tube, as explained above.

FIG. 6 is a flow diagram illustrating a method 600 of detecting a liquid level in a reservoir, according to at least one embodiment of the present disclosure. At operation 610, a liquid may be drawn from a reservoir through a channel with a pump. For example, an impeller pump, a displacement pump, a diaphragm pump, a peristaltic pump, a gear pump, a rotary vane pump, or the like may be used to draw a liquid (e.g., water to be purified, a dialysate component, etc.) through the channel.

At operation 620, the liquid may be drawn into the channel from a first tube section of a J-tube. The first tube section may be mechanically and fluidically coupled (e.g., removably coupled) to the channel. The J-tube may be positioned in the reservoir at least partially submerged in the liquid.

At operation 630, at least some of the liquid may be drawn into the first tube section from a second tube section that extends along the first tube section. The liquid may be partially drawn through perforations extending between the first tube section and the second tube section, such as through a common wall between the first and second tube sections. In addition, liquid from the reservoir may be drawn into the first tube section of the J-tube through a draw-hole located at a distal end (e.g., a bottom end) of the first tube section.

At operation 640, a pressure sensor may be used to detect a pressure drop in the liquid drawn through the channel when a liquid level within the reservoir passes a respective one of the perforations. This pressure drop may be used to determine the liquid level within the reservoir. In some examples, a float within the second tube section of the J-tube may be allowed to drop and pass the perforations as the liquid level in the reservoir drops, which may facilitate the detection of the pressure drop. In some embodiments, a flow sensor may sense a flow rate of the fluid drawn from the reservoir through the channel. Data from the flow sensor and the pressure sensor may be used to determine and/or predict the liquid level within the reservoir.

Accordingly, the present disclosure includes systems, devices, and methods for detecting a liquid level in a reservoir. These systems may use a J-tube with spaced perforations to detect pressure drops, which may in turn be used to determine and/or predict the liquid level. The J-tube may be relatively easy and cost-effective to manufacture and may add little or no weight to fluidic systems.

In some examples, relational terms, such as "first," "second," "upper," "lower," etc., may be used for clarity and convenience in understanding the disclosure and accompanying drawings and do not connote or depend on any specific preference, orientation, or order, except where the context clearly indicates otherwise.

For the purposes of describing and defining the present invention it is noted that the use of relative terms, such as "about," and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

The following example embodiments are also included in the present disclosure.

Example 1: A liquid level detector, which may include: a pump for drawing liquid from a reservoir; a channel fluidically coupling the pump to the reservoir; a J-tube connected to an end of the channel within the reservoir, the J-tube including: a first tube section including a proximal end configured to couple to the end of the channel and a distal end extending downward into the reservoir; a second tube section extending upward from the distal end of the first tube section and along the first tube section; and perforations extending between the first tube section and the second tube section; and a pressure sensor positioned and configured to sense a pressure of liquid drawn from the reservoir through the J-tube and the channel and to sense pressure drops when a liquid level in the reservoir passes the respective perforations.

Example 2: The liquid level detector of Example 1, wherein the J-tube further includes a float positioned within the second tube section and shaped and sized to drop within the second tube section as the liquid level in the reservoir drops.

Example 3: The liquid level detector of Example 1 or Example 2, wherein the J-tube further includes a curved section coupling the distal end of the first tube section to the second tube section.

Example 4: The liquid level detector of Example 3, wherein the curved section includes a draw hole shaped and sized to draw the liquid from the reservoir and into the J-tube in response to activation of the pump.

Example 5: The liquid level detector of any of Examples 1 through 4, wherein the perforations pass through a common wall between the first tube section and the second tube section.

Example 6: The liquid level detector of any of Examples 1 through 5, further including a water purifier positioned and configured to receive, via the pump, water from the reservoir and to purify the water.

Example 7: The liquid level detector of any of Examples 1 through 6, wherein the reservoir includes substantially vertical sidewalls.

Example 8: The liquid level detector of any of Examples 1 through 7, wherein the channel is removably coupled to the J-tube with a luer-lock connection.

Example 9: The liquid level detector of any of Examples 1 through 8, further including a flow rate sensor positioned and configured to sense a flow rate of liquid drawn from the reservoir through the J-tube and the channel by the pump.

Example 10: The liquid level detector of any of Examples 1 through 9, further including additional perforations passing through an outer wall of the second tube section and in fluid communication with the reservoir.

Example 11: A J-tube for withdrawing a liquid from a reservoir, the J-tube including: a first tube section including a proximal end configured to couple to the end of a channel and a distal end for extending downward into the reservoir; a second tube section extending upward from the distal end of the first tube section and along the first tube section, the first tube section and the second tube section sharing a common wall; and perforations passing through the common wall between the first tube section and the second tube section.

Example 12: The J-tube of any of Example 11, further including a curved section coupling the distal end of the first tube section to the second tube section.

Example 13: The J-tube of Example 11 or Example 12, wherein the curved section includes a draw hole shaped and sized to provide fluid communication between the reservoir and an interior of the J-tube.

Example 14: The J-tube of any of Examples 11 through 13, further including a float positioned within the second tube section and shaped and sized to drop within the second tube section as the liquid level in the reservoir drops.

Example 15: The J-tube of any of Examples 11 through 14, further including an upper perforation in the first tube section above the second tube section.

Example 16: The J-tube of any of Examples 11 through 15, wherein each perforation has a diameter of about 0.5 mm or less.

Example 17: A method of detecting a liquid level in a reservoir, which may include: drawing liquid from a reservoir through a channel with a pump; drawing the liquid into the channel from a first tube section of a J-tube; drawing at least some of the liquid into the first tube section of the J-tube from a second tube section of the J-tube that extends along the first tube section and through perforations extending between the first tube section and the second tube section; and detecting, with a pressure sensor, a pressure drop in the liquid drawn through the channel when a liquid level within the reservoir passes a respective one of the perforations to determine the liquid level within the reservoir.

Example 18: The method of Example 17, further including allowing a float within the second tube section to drop and pass the perforations as the liquid level in the reservoir drops.

Example 19: The method of Example 17 or Example 18, further including drawing the liquid from the reservoir into the first tube section of the J-tube through a draw hole located at a distal end of the first tube section of the J-tube.

Example 20: The method of any of Examples 17 through 19, further including sensing, with a flow sensor, a flow rate of the fluid drawn from the reservoir through the channel.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A liquid level detector, comprising:
a pump for drawing liquid from a reservoir;
a channel fluidically coupling the pump to the reservoir;
a J-tube connected to an end of the channel within the reservoir, the J-tube comprising:
a first tube section comprising a proximal end configured to couple to the end of the channel and a distal end extending downward into the reservoir;
a second tube section extending upward from the distal end of the first tube section and along the first tube section; and
perforations extending between the first tube section and the second tube section; and
a pressure sensor positioned and configured to sense a pressure of liquid drawn from the reservoir through the J-tube and the channel and to sense pressure drops when a liquid level in the reservoir passes the respective perforations.

2. The liquid level detector of claim 1, wherein the J-tube further comprises a float positioned within the second tube section and shaped and sized to drop within the second tube section as the liquid level in the reservoir drops.

3. The liquid level detector of claim 1, wherein the J-tube further comprises a curved section coupling the distal end of the first tube section to the second tube section.

4. The liquid level detector of claim 3, wherein the curved section comprises a draw hole shaped and sized to draw the liquid from the reservoir and into the J-tube in response to activation of the pump.

5. The liquid level detector of claim 1, wherein the perforations pass through a common wall between the first tube section and the second tube section.

6. The liquid level detector of claim 1, further comprising a water purifier positioned and configured to receive, via the pump, water from the reservoir and to purify the water.

7. The liquid level detector of claim 1, wherein the reservoir comprises substantially vertical sidewalls.

8. The liquid level detector of claim 1, wherein the channel is removably coupled to the J-tube with a luer-lock connection.

9. The liquid level detector of claim 1, further comprising a flow rate sensor positioned and configured to sense a flow rate of liquid drawn from the reservoir through the J-tube and the channel by the pump.

10. The liquid level detector of claim 1, further comprising additional perforations passing through an outer wall of the second tube section and in fluid communication with the reservoir.

11. A J-tube for withdrawing a liquid from a reservoir, the J-tube comprising:
a first tube section comprising a proximal end configured to couple to the end of a channel and a distal end for extending downward into the reservoir;
a second tube section extending upward from the distal end of the first tube section and along the first tube section, the first tube section and the second tube section sharing a common wall; and
perforations passing through the common wall between the first tube section and the second tube section.

12. The J-tube of claim 11, further comprising a curved section coupling the distal end of the first tube section to the second tube section.

13. The J-tube of claim 12, wherein the curved section comprises a draw hole shaped and sized to provide fluid communication between the reservoir and an interior of the J-tube.

14. The J-tube of claim 11, further comprising a float positioned within the second tube section and shaped and sized to drop within the second tube section as the liquid level in the reservoir drops.

15. The J-tube of claim 11, further comprising an upper perforation in the first tube section above the second tube section.

16. The J-tube of claim 11, wherein each perforation has a diameter of about 0.5 mm or less.

17. A method of detecting a liquid level in a reservoir, the method comprising:
drawing liquid from a reservoir through a channel with a pump;
drawing the liquid into the channel from a first tube section of a J-tube;
drawing at least some of the liquid into the first tube section of the J-tube from a second tube section of the J-tube that extends along the first tube section and through perforations extending between the first tube section and the second tube section; and
detecting, with a pressure sensor, a pressure drop in the liquid drawn through the channel when a liquid level within the reservoir passes a respective one of the perforations to determine the liquid level within the reservoir.

18. The method of claim 17, further comprising allowing a float within the second tube section to drop and pass the perforations as the liquid level in the reservoir drops.

19. The method of claim 17, further comprising drawing the liquid from the reservoir into the first tube section of the J-tube through a draw hole located at a distal end of the first tube section of the J-tube.

20. The method of claim 17, further comprising sensing, with a flow sensor, a flow rate of the fluid drawn from the reservoir through the channel.

* * * * *